United States Patent
Drabenstott

(10) Patent No.: US 12,169,466 B2
(45) Date of Patent: Dec. 17, 2024

(54) DISTRIBUTED ARBITRATION FOR SHARED DATA PATH

(71) Applicant: Marvell Asia Pte Ltd, Singapore (SG)

(72) Inventor: Thomas Lorne Drabenstott, Cary, NC (US)

(73) Assignee: MARVELL ASIA PTE LTD, Singapore (SG)

( * ) Notice: Subject to any disclaimer, the term of this patent is extended or adjusted under 35 U.S.C. 154(b) by 64 days.

(21) Appl. No.: 18/160,127

(22) Filed: Jan. 26, 2023

(65) Prior Publication Data

US 2024/0152477 A1  May 9, 2024

Related U.S. Application Data

(60) Provisional application No. 63/422,407, filed on Nov. 3, 2022.

(51) Int. Cl.
*G06F 13/42* (2006.01)
*G06F 9/52* (2006.01)

(52) U.S. Cl.
CPC ............... *G06F 13/42* (2013.01); *G06F 9/52* (2013.01)

(58) Field of Classification Search
CPC .................................. G06F 13/42; G06F 9/52
See application file for complete search history.

(56) References Cited

U.S. PATENT DOCUMENTS

| | | | |
|---|---|---|---|
| 7,930,456 B1* | 4/2011 | Davis | H04L 45/00 710/243 |
| 8,060,647 B2* | 11/2011 | Basu | H04L 47/10 710/240 |
| 8,386,682 B2* | 2/2013 | Yeem | G06F 13/364 710/240 |
| 8,688,881 B2* | 4/2014 | Naylor | G06F 13/374 710/242 |
| 10,515,047 B1* | 12/2019 | Maidee | G06F 13/4027 |
| 10,866,736 B2* | 12/2020 | Hsu | G06F 3/0679 |
| 11,269,638 B2* | 3/2022 | Zbiciak | G06F 9/3004 |
| 2008/0089321 A1* | 4/2008 | Arulappan | H04L 49/355 370/386 |
| 2014/0240326 A1* | 8/2014 | Cutter | G06F 13/1626 711/147 |
| 2016/0179707 A1* | 6/2016 | Chedda | G06F 9/52 710/244 |
| 2018/0089122 A1* | 3/2018 | Oz | G06F 13/37 |
| 2022/0197857 A1* | 6/2022 | Felix | G06F 9/30087 |

* cited by examiner

*Primary Examiner* — Henry Tsai
*Assistant Examiner* — Christopher A Daley
(74) *Attorney, Agent, or Firm* — Hamilton, Brook, Smith & Reynolds, P.C.

(57) ABSTRACT

Passage of data packets on a data pipeline is arbitrated in a distributed manner along the pipeline. Multiple data arbiters each operate to merge data from a respective data source to the data pipeline at a distinct point in the pipeline. At each stage, a multiplexer selectively passes, to the data pipeline, an upstream data packet or a local data packet from the respective data source. A register stores an indication of data packets passed by the multiplexer based on the respective data source originating the data packet. A controller controls the multiplexer to select the upstream data packet or the local data packet based on the indication of data packets passed by the multiplexer.

21 Claims, 5 Drawing Sheets

DISTRIBUTED ARBITRATION FOR SHARED DATA PATH

RELATED APPLICATION

This application claims the benefit of U.S. Provisional Application No. 63/422,407, filed on Nov. 3, 2022. The entire teachings of the above application are incorporated herein by reference.

BACKGROUND

Modern integrated circuits frequently implement data paths that carry data from multiple sources to a single receiver. For example, conventional systems-on-chip (SOCs) may integrate several processor cores on a single substrate, and those cores may access a shared memory via a shared data bus. In another example, an SOC may comprise several interfaces for communications with off-chip devices that are configured to utilize a single on-chip device, such as a cryptographic engine for encrypting or decrypting data. Arbitrating access to such shared resources is known as a many-to-one communications problem. To address this problem, conventional SOCs employ bus or interface controllers that buffer data or requests and determine an order to pass the data or requests according to an algorithm, such as a round-robin scheduling process.

SUMMARY

Example embodiments include a circuit for arbitrating passage of data packets on a data pipeline. The data pipeline may connect multiple data sources to a data receiver. A plurality of data arbiters may each be configured to merge data from a respective data source of the multiple data sources to the data pipeline at a distinct point in the pipeline. Each of the plurality of data arbiters may include a multiplexer, a register, and a controller. The multiplexer may be configured to selectively pass, to the data pipeline, an upstream data packet or a local data packet from the respective data source. The register may be configured to store an indication of data packets passed by the multiplexer based on the respective data source originating the data packet. The controller may be configured to control the multiplexer to select the upstream data packet or the local data packet based on the indication of data packets passed by the multiplexer.

The controller may be further configured to 1) based on the absence of an entry for the data source originating the upstream packet, select the upstream packet and add the entry for the data source to the register, and 2) based on the register including an entry for the data source originating the upstream packet, select the local packet and clear the register. Each of the plurality of data arbiters may further include a first in, first out (FIFO) buffer for storing at least one of the upstream data packet and the local data packet. The controller may be further configured to cause the register to store the indication of data packets passed by the multiplexer based on a respective tag associated with each of the data packets, the respective tag indicating the respective data source originating the data packet.

An upstream data arbiter may be configured to merge data from at least two of the multiple data sources at a point upstream of the pipeline, the data arbiter including a register configured to store an indication of data packets passed by the data arbiter based on the respective data source originating the data packet. The upstream data arbiter may be a first upstream data arbiter, and a second upstream data arbiter may be configured to merge data from the first upstream data arbiter and at least one of the multiple data sources at a further point upstream of the pipeline. The data pipeline may include at least two parallel segments, and further comprising a further data arbiter configured to merge data from at least two parallel segments to a unified segment of the data pipeline.

The data packet may include at least one of 1) a request to read or write data at a device at a terminal point of the data pipeline, 2) data to be stored at a device at a terminal point of the data pipeline, and 3) a request to access a resource at a terminal point of the data pipeline. The register may maintain a count of data packets passed by the multiplexer based on the respective data source originating the data packet, the controller may be further configured to: 1) based on a count for the data source originating the upstream packet being below a threshold, select the upstream packet and increment the count for the data source at the register, and 2) based on the count exceeding the threshold, select the local packet and clear the register. The controller may be further configured to control the multiplexer to select the upstream data packet based on a flag indicating a requirement to forward a sequence of multiple data packets without interruption.

Further embodiments include a method of arbitrating data traffic. At each of a plurality of distinct points in a data pipeline connecting multiple data sources to a data receiver, an upstream data packet or a local data packet from a respective data source may be selectively passed to the data pipeline. An indication of data packets passed based on the respective data source originating the data packet may be stored. The upstream data packet or the local data packet may be selected to be passed based on the indication of data packets passed by the multiplexer.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

Example embodiments provide a fair and efficient means for arbitrating a single multi-stage data path shared by multiple initiators, each of which may have a buffer (e.g., a first in, first out (FIFO) buffer) of data destined for a data sink at the end of the data path. Such embodiments enable data to be moved downstream at each stage and on each cycle while also fairly sharing the available bandwidth of the data path among the initiators.

Figure 1:
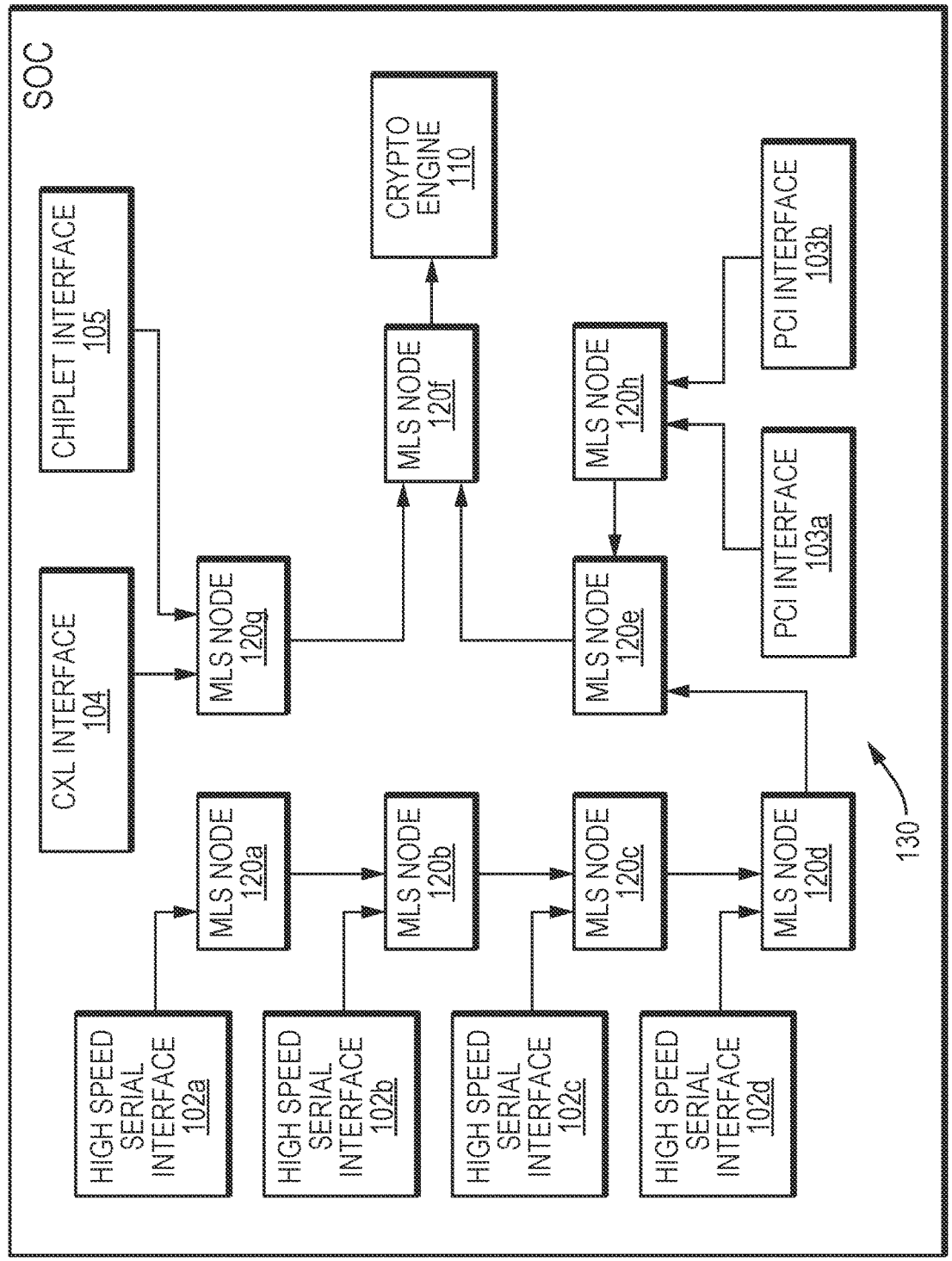
FIG. 1 is a block diagram of a system-on-chip (SOC) in which example embodiments may be implemented.

FIG. 1 is a block diagram of a system-on-chip (SOC) 100 in which example embodiments may be implemented. In this example, the SOC 100 includes multiple interfaces for devices that may be on-chip and/or off-chip, including high speed serial interfaces 102a-d, peripheral component interconnect (PCI) interfaces 103a-b, a compute express link (CXL) interface 104, and a chiplet interface 105. Some or all of the devices connected to these interfaces may send data to a cryptography engine 110, which may encrypt or decrypt the data as required for a given operation. In alternative embodiments, any other shared resource may be implemented in place of (or in addition to) the cryptography engine 110, such as a shared memory subsystem or an interface for outbound communications. Further, the data forwarded by the interfaces may be data to be processed or stored, or may be commands and/or access requests for use of the shared resource.

To arbitrate access to a shared resource having a single input port such as the cryptography engine 110, conventional SOCs employ bus or interface controllers that are centrally located, and operate to buffer data and determine an order to pass the data or requests according to an algorithm. However, such approaches face disadvantages when implemented for larger numbers of sources or longer data paths. For example, sources at a far end of a data path suffer from greater transmission latency than sources closer to the receiver, and as a result, a bus controller may receive data or requests after a substantial delay, leading to a loss in performance and/or efficiency.

In contrast, in the example shown, a data pipeline 130 may comprise a plurality of data arbiters 120a-h (also referred to as merge lane shuffle (MLS) nodes) to carry the data from the multiple interfaces 102a-d, 103a-b, 104, 105 to the cryptography engine 110. Each of the data arbiters 120a-h may be configured to merge data from a respective data source to the data pipeline 130 at a distinct point in the pipeline 130. Each of the data arbiters 120a-h may operate independently of one another to determine whether to pass a "local" data packet (e.g., from a nearby data source) or an "upstream" data packet (e.g., from a preceding data arbiter in the data pipeline 130) based on a record of data packets that were previously passed by the data arbiter. As a result, the data pipeline 130 may arbitrate access to the crypto engine 110 fairly and efficiently by distributing arbitration along multiple points in the data pipeline 130.

Further embodiments may be applied to arbitrate access to a resource shared by multiple requestors distributed in different locations relative to the resource. For example, a network-on-chip (NoC) may include a mesh memory system surrounded by multiple devices configured to access the memory system. To arbitrate access to the memory system, a data pipeline, configured comparably to the data pipeline 130 described above, may be implemented as one or more rings around the memory system, wherein the rings are configured to collect data/requests among the multiple devices, arbitrate the data/requests to determine an order of the data/requests, and provide the data/requests to the memory system.

Figure 2:
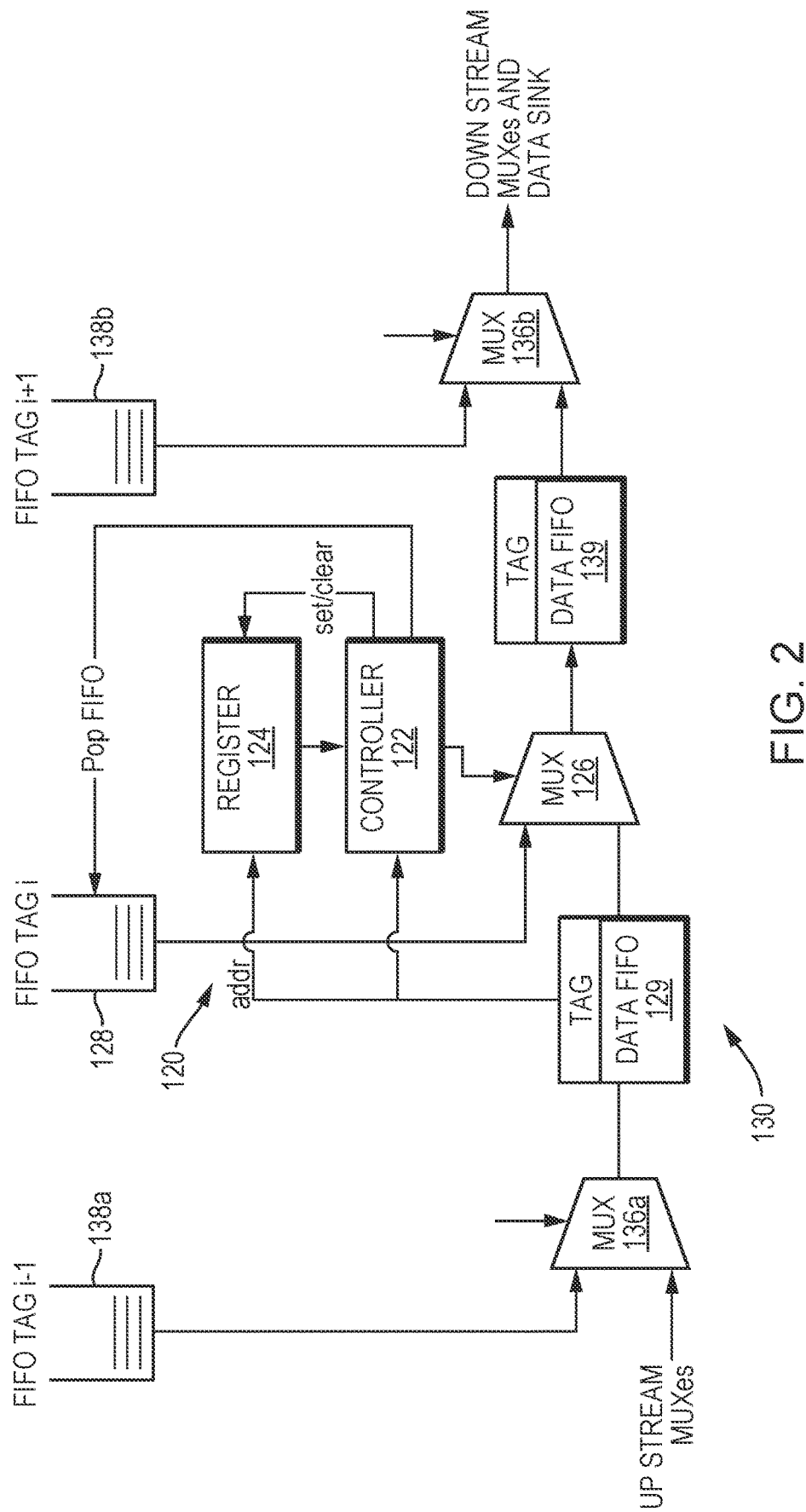
FIG. 2 is a circuit diagram of a data arbiter in one embodiment.

FIG. 2 is a circuit diagram of a data arbiter 120 in further detail. The data arbiter 120 may include a multiplexer 126 in-line with the data pipeline 130 and configured to selectively pass packets downstream along the data pipeline 130. In particular, the multiplexer 126 may select an upstream data packet from an upstream pipeline FIFO 129 or a local data packet from a local data source buffered at a local FIFO 128. A register 124 may store an indication of data packets passed by the multiplexer 126 based on the respective data source originating the data packet. A controller 122 may control the multiplexer 126 to select the upstream data packet or the local data packet based on the indication of data packets passed by the multiplexer 126.

In addition to the data arbiter 120, a selection of other components of the data pipeline 130 are shown, including an upstream source FIFO 138a and upstream multiplexer 136a that forwards data to the upstream pipeline FIFO 129. Similarly, a downstream multiplexer 136b is a component of a downstream data arbiter that selects between the output of the multiplexer 126 (buffered at a downstream pipeline FIFO 139) and data at a downstream source FIFO 138b.

Figure 3:
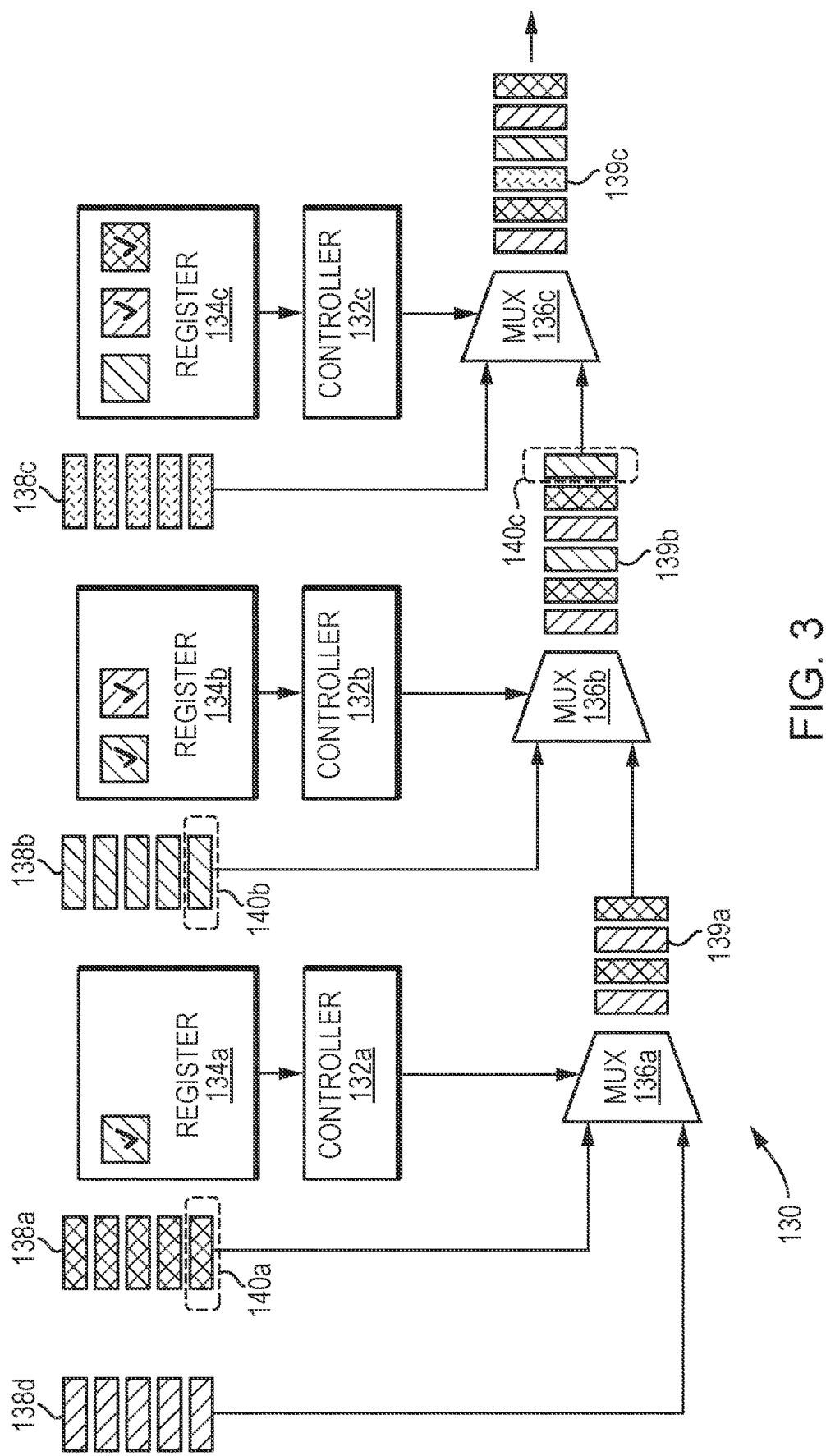
FIG. 3 is a diagram illustrating an arbitration process in one embodiment.

FIG. 3 illustrates the data pipeline 130 during an arbitration process in one embodiment. The subset of the data pipeline 130 shown includes three stages, each of which may be configured as the data arbiter 120 described above. For clarity, only a selection of the aforementioned elements is shown. The three stages are each represented by a respective multiplexer 136a-c, controller 132a-c, register 134a-c, pipeline FIFO 139a-c, and local FIFO 138a-c. The first stage multiplexer 136a may connect to one or more additional stages configured similarly, or may receive data from a further local FIFO 138d as shown. Likewise, the third stage multiplexer 136c and pipeline FIFO 139c may output the data to a receiver such as the cryptography engine 110 of FIG. 1, or may output the data to one or more additional stages configured similarly and preceding the receiver.

A distinct identifier (ID) tag (e.g., an n-bit tag) may be associated with each data source or local FIFO 138a-d, and each local FIFO 138a-d or other circuit may attach the tag to data packets originating from that source. For example, for N sources, the tag may be log 2(N) bits long. At each stage of the data pipeline 130 defined by the respective multiplexer 136a-c, pipeline FIFO 139a-c, and other components described above, an arbitration decision is made (e.g., by the controller 122 in FIG. 2) whether to select and pass along data from the previous stage or select and pop data from the pipeline FIFO 139a-c preceding the multiplexer 136a-c of the given stage. Each stage may have an N-bit "Sent" bit vector where it records, to the register 134a-c, the tag of all packets it has arbitrated to send downstream.

In one example, arbitration at each stage may be performed as follows: If the corresponding tag bit in the register 134a-c is "false," signifying that that particular tag has not been sent downstream yet, the controller 132a-c selects the upstream pipeline data FIFO 139a-c. If the corresponding tag bit is instead "true," the controller 132a-c may select data from the local FIFO 138a-c of the current stage and simultaneously clear the entire sent vector at the register 134a-c to "false." Keeping track of packets and arbitrating based on a point-of-origin tag thus creates a shuffling effect that dynamically and fairly adapts to new sources of packets without loss of bus efficiency (i.e., unused transfer cycles) or added latency.

The arbitration process described above is illustrated at each stage of FIG. 3. At the first stage, the controller 132a determines whether to pass a data packet from the upstream source FIFO 138d or the local FIFO 138a. To do so, the controller 132a may use a source tag (or other information indicating the source of the packets) of the upstream FIFO 138d to look up a corresponding entry at the register 134a. As shown, the register 134a includes an entry for the upstream FIFO 138d, as indicated by the checkmark. Accordingly, the controller 132a may control the multiplexer 136a to pass the next data packet 140a of the local FIFO 138a, and clear the register 134a by removing all entries (e.g., setting all entries to "false"). At the second stage, the controller 132b determines whether to pass a data packet from the upstream pipeline FIFO 139a or the local FIFO 138b. The controller 132a may look up an entry at the register 134b corresponding to the source of the next packet in the upstream pipeline FIFO 139a. As shown, the register 134b includes an entry for the source of this packet. In response, the controller 132b may control the multiplexer 136b to pass the next data packet 140b of the local FIFO 138b, and clear the register 134b. At the third stage, the controller 132c determines whether to pass a data packet from the upstream pipeline FIFO 139b or the local FIFO 138c. The controller 132c may look up an entry at the register 134c corresponding to the source of the next packet 140c in the upstream pipeline FIFO 139b. As shown, the register 134c does not include an entry for the packet 140c, as indicated by the unchecked box. In response, the controller 132b may control the multiplexer 136b to pass the next data packet 140c of the pipeline FIFO 139b, and update the register 134c by adding an entry corresponding to the source of the packet 140c (i.e., FIFO 138b).

As described in the example above, each of the registers 134a-c maintains a record of a single, binary entry for each source, which may be implemented by a bit vector (one bit per source ID). In a further embodiment, the register 134a-c may be configured with a vector of multi-bit counters (greater than 1 bit per source ID) and have a variable threshold of allowed packets for each upstream source instead of a threshold of just a single packet. This configuration could help to clear out upstream traffic more quickly, reducing the time needed to achieve shuffling fairness. The thresholds may be the same for each initiator (source), or may decrease going upstream in order to maintain fairness and efficiency. In one example, upon receiving an upstream packet, the controller 132b would reference the register 134b to compare the corresponding counter to the threshold for the source originating the packet. If the count is less than the threshold, then the scoreboard counter would be incremented, and the multiplexer 139b would pass the upstream data packet. If the count is instead greater or equal to the threshold, the controller 132a may choose data from the local data FIFO 138b for up to a threshold number of cycles, and then clear the register 134b.

In one example, the threshold for a given source may become larger in proportion to downstream distance to maintain fair arbitration. Also, to avoid depriving a source of the shared resource, the arbiters may keep count of how many upstream packets it allowed. After allowing a configurable number of duplicate packets, then it may allow the local source to send that many packets as well. This approach may be considered a form of lookahead, meaning that by allowing some duplicate packets to pass from upstream, some unique packets may arrive from upstream that can be shuffled in and achieve fairness with less latency. Such a configuration may be less useful with contiguous streams of data and more useful when the streams are intermittent with only 1 or a few cycles in between packets.

In further embodiments, such as arbitration of cache line accesses, it may be necessary that multiple transfers from a chosen source occur contiguously without data packets from another source to be shuffled in. To accommodate this requirement, an additional signal bit or flag, "last packet," may be associated with each data packet along with the ID tag. If the "last packet" bit is asserted, the arbitration process may proceed as described above. If the "last packet" bit is de-asserted, the data arbiter may continue to select the given source for subsequent packets even if the scoreboard threshold is reached, guaranteeing that the burst will remaining contiguous throughout the pipeline and at the sink. If a multi-bit counter describe in the last section is being used in the scoreboard, the count may saturate at the threshold during bursts. However, unbalanced usage of bursts across initiators may lead to a loss in fair selection among the sources. Accordingly, further embodiments may employ additional logic at the controller that does not allow a burst to begin unless the scoreboard count associated with the ID is low enough to accommodate the burst size.

Often it is desirable to give a weighted share of bandwidth to a subset of initiators to meet varying system requirements. Using a plurality of data arbiters as described above, such weighting can be accomplished by expanding the single ID assigned to each initiator to a range of virtual IDs that, from the view of the arbiter, appear to be originating from multiple initiators despite having a single, common initiator. This approach would necessarily increase the width of the scoreboard vector to accommodate the new IDs. Additionally, the initiator can be configured to cycle through each of its virtual IDs when tagging traffic sent downstream. Under full load, the percentage of bandwidth for a given initiator may be calculated as: (number of virtual IDs assigned to initiator)/(total number of virtual IDs for all initiators) *100%.

Turning again to FIG. 3, a further embodiment may be implement without the use of the registers 134a-c and with the controllers 132a-c operating a different arbitration process. In this example, a single bit, referred to as a "head" bit, may be associated with each data packet, and may be set to identify the first packet of a sequence of packets with unique sources from the upstream pipeline. The head bit is therefore a marker that informs that controller 132a-c at each stage when it can merge a packet from the local FIFO 138a-c into the data pipeline 130. The controller 132a-c may therefore cause the multiplexer 136a-c to pass the head==1 packet and all subsequent upstream packets downstream until it sees another head==1 bit, at which point it passes a data packet of its own (with head=0) if it has one. In this manner, the string of packets with unique sources grows by 1 at each stage. Thus, two strings of unique source sequences, when combined, also produces a string of unique source sequences. In this approach, it may be unnecessary to check the source IDs at each node, an instead trust that the upstream node operated the same process accordingly, creating a string of unique source packets and then merging in the local packet at the end of the string. Thus, the controller 132a-c at each stage may perform the following arbitration process:

a) Pass upstream packets until a packet with a head bit set to 1 is detected. At this point, pass a local packet with head bit set to 0.

b) If there are no upstream packets, pass a local packet with a head bit set to 1.

Figure 4:
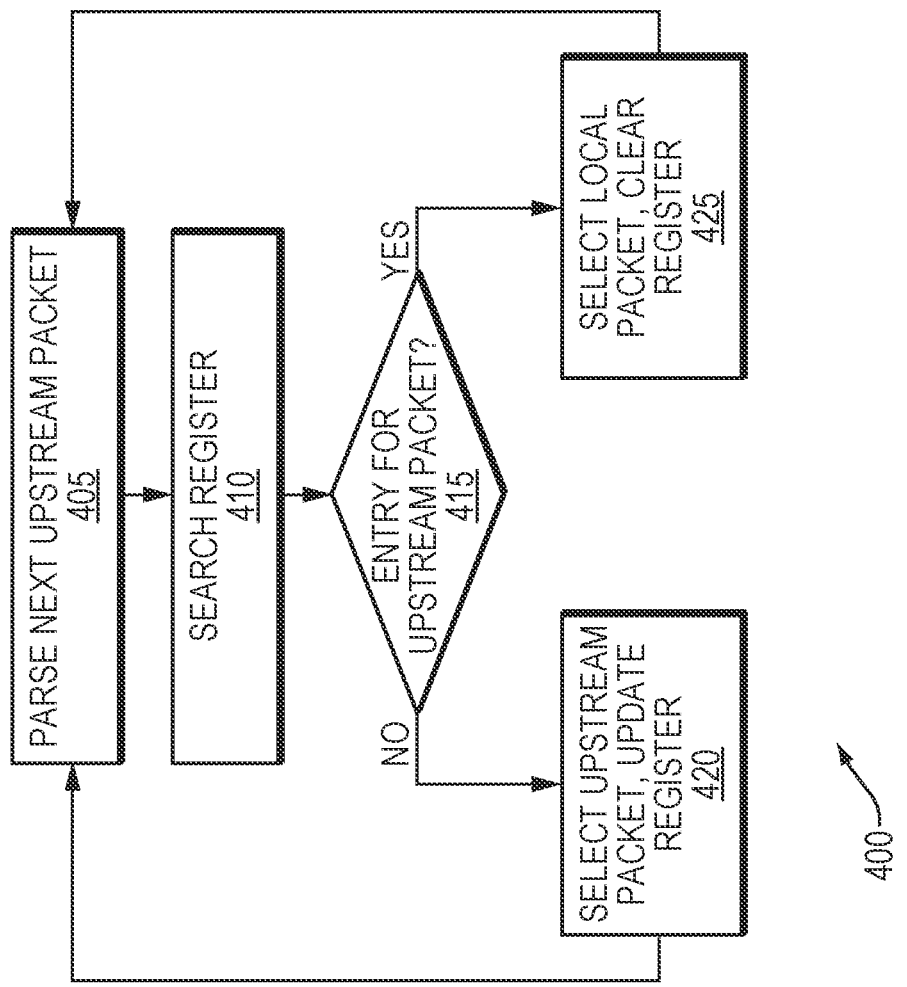
FIG. 4 is a flow diagram of an arbitration process in one embodiment.

FIG. 4 is a flow diagram of an example arbitration process 400 that may be carried out by the data arbiters described above. The process 400 is comparable to the arbitration process described above with reference to FIG. 3, and may be carried out by the controllers 132a-c of FIG. 3 or the controller 122 of FIG. 2. With reference to FIG. 2, the controller 122 may first parse the next packet at each of the upstream pipeline FIFO 129 to locate a tag identifying the source of the next packet (405). Using the tag, the controller 122 may then search the register 124 to locate an entry corresponding to the source of the of the next packet in the upstream pipeline FIFO 129 (410), and determines whether such an entry is found (415). If the entry is not found at the register 124, then the controller 122 may control the multiplexer 126 to select the upstream packet to pass next, and update the register 124 to add an entry corresponding to the source of the packet (420). If the entry is found at the register 124, then the controller 122 may control the multiplexer 126 to select the local packet to pass next, and clear the register to remove all entries (425).

The process 400 may be adapted to operate for a variety of different arbitration operations. With reference to FIG. 1, for example, the data arbiter 120g is configured to merge data from two sources 104, 105. To do so, the data arbiter 120g may assign one source 104 as the "local" source, and the other source 105 as the "upstream" source, even if both sources are directly connected to the data arbiter 120g as shown. Under this configuration, the data arbiter 120g may perform the arbitration process 400 as described above. In a further example, the data arbiter 120f may merge data from two parallel branches of the data pipeline 130 as shown, each terminating in a respective upstream data arbiter 120e, 120g. Accordingly, the data arbiter 120f may assign one data arbiter 120g as the "local" source, and the other source 120e as the "upstream" source. The data arbiter 120f may then perform the arbitration process 400 as described above. If one branch of the pipeline carries more data traffic than the other, or carries data traffic from more sources or higher priority sources than the other, then assigning that branch as the "upstream" source may ensure a more balanced arbitration by giving higher priority to that branch. A further alternative arbitration process, which alternates scoring among the inputs of each arbiter, is described below with reference to FIG. 5.

In addition to arbitrating data read/write requests and/or responses, in further embodiments, data arbiters as described above can be configured to fairly and efficiently grant requests to initiators at a fixed rate. Such an application may be useful in cases where there are many distributed initiators that are configured to utilize a given resource, such as a memory mesh, but on average the resource can only service one initiator per cycle. The data arbiters can be configured to emulate request/grant arbitration by arbitrating request tokens, wherein the receiver responds with grant tokens. Once a requesting initiator receives a grant token, it can immediately begin accessing some shared resource. During times of high request activity, fairness would be achieved in the same manner as described above by selectively shuffling in upstream requests prior to passing a local request. Such resource arbitration can guarantee against over-utilization by only issuing one grant per cycle. Further, the round-trip latency in such a configuration may be 2× the number of hops away from the resource arbitration point. For a string of N Adapters arbitrating for the same resource, the latency could be reduced in half to N/2 hops by placing the arbitration point in the center and designing it to service requests from either side simultaneously in a round-robin fashion.

Optionally, during times of low activity or idleness, the resource arbitration point may send out "wildcard grants" on the grant response pipeline, which could be utilized by the first initiator that obtains them. This approach may decrease latency and increase utilization at negligible cost. While upstream initiators could deprive downstream ones from wildcard grants, the effect may only be temporary because if an initiator failed to grab a wildcard grant, it would submit request token(s) and be guaranteed fair service through the shuffle algorithm.

Figure 5:
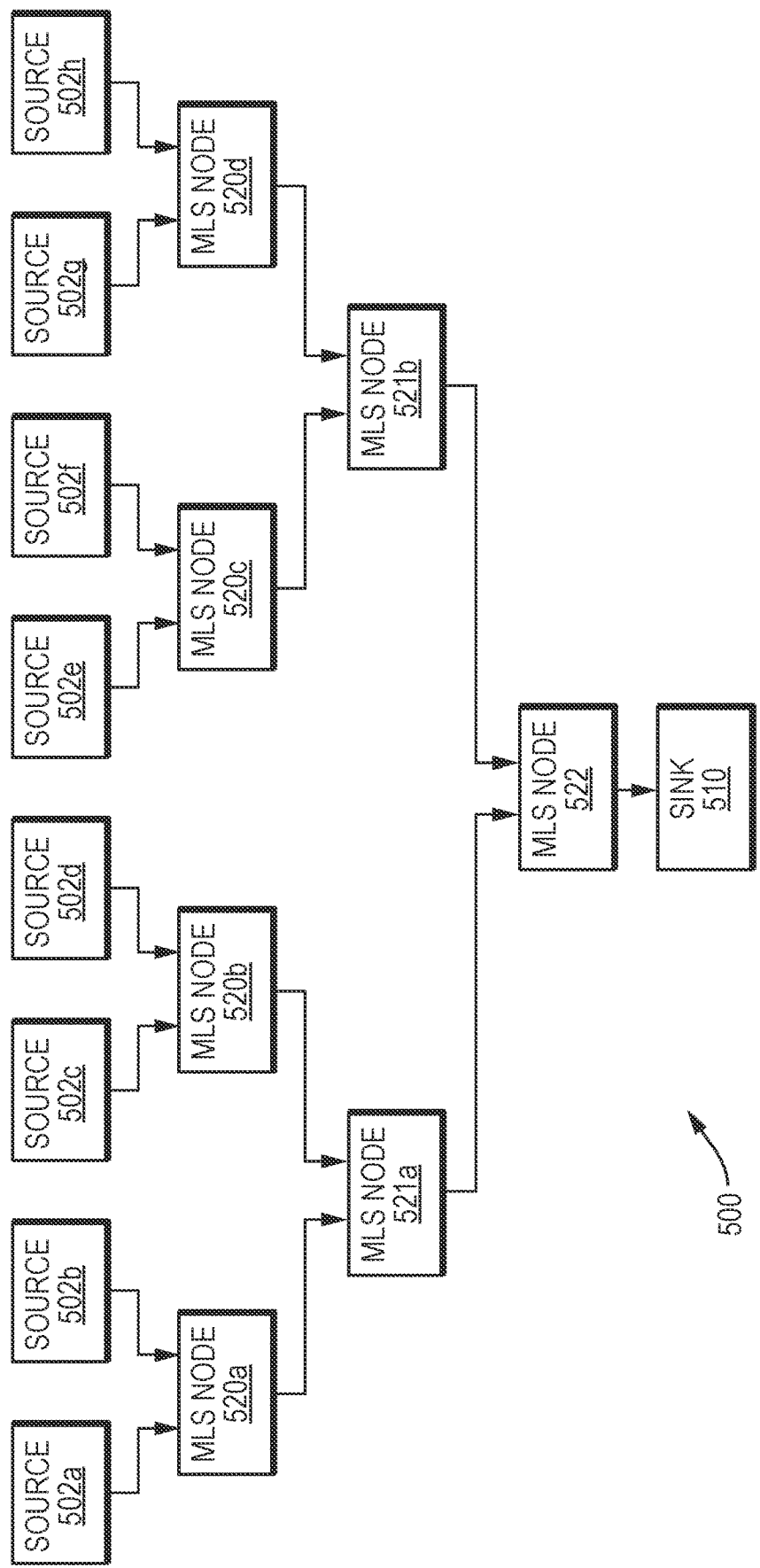
FIG. 5 is a block diagram of a many-to-one reduction tree circuit in one embodiment.

FIG. 5 illustrates an example many-to-one reduction tree circuit 500 implementing a plurality of data arbiters. As shown, a plurality of data sources 502a-h provide data (e.g., information, commands, requests, etc.) to a single data sink 510. To reduce the parallel data outputs of each data source 502a-h to a single input to the data sink 510, a plurality of data arbiters, configured as described above, may be implemented in interconnected tiers. The tiers include a first tier of data arbiters 520a-d that reduces the 8 source outputs to 4, a second tier of data arbiters 521a-b that reduces the 4 outputs of the first tier to 2, and a third tier comprising a single data arbiter 522 that reduces the 2 outputs of the second tier to a single input to the data sink 510.

In contrast to the arbitration process described above, each of the data arbiters may be configured to alternate between data from left and right upstream legs until the register indicates that a threshold for a given source is reached, wherein the threshold may be 1 or greater. When a threshold is reached, the data arbiter may pass data only from the other leg until the threshold of another source is reached, at which point the register may be cleared and the process begins again. The threshold for each source may be distinct, and may be configured to prioritize a selection of sources or branches. For example, if the source 502a is desired to have higher priority over the data source 502d, then the data arbiter 521a may be configured such that its register assigns a higher threshold number to the source 502a than to the source 502d.

In contrast to the SOC 100 that implements a data pipeline 130 as described above, the circuit 500 demonstrates the application of distributed data arbiters in topologies wherein the source of data for either leg is the output from a previous data arbitration node. Such many-to-one reduction structures can be used for memory crossbars or communication crossbars where a tree is instantiated for each sink in one direction. In a further embodiment, where one or more data sinks provide response data to the sources, a plurality of trees may be implemented wherein the sinks are designated as the leaves and sources are designated as the root.

While example embodiments have been particularly shown and described, it will be understood by those skilled in the art that various changes in form and details may be made therein without departing from the scope of the embodiments encompassed by the appended claims.

What is claimed is:
1. A circuit, comprising:
a data pipeline connecting multiple data sources to a data receiver; and
a plurality of data arbiters each configured to merge data from a respective data source of the multiple data sources to the data pipeline at a distinct point in the pipeline, each of the plurality of data arbiters including:
a multiplexer configured to selectively pass, to the data pipeline, an upstream data packet or a local data packet from the respective data source;
a register configured to store an indication of data packets passed by the multiplexer based on the respective data source originating the data packet; and
a controller configured to control the multiplexer to select the upstream data packet or the local data packet based on the indication of data packets passed by the multiplexer.
2. The circuit of claim 1, wherein the controller is further configured to:
based on the absence of an entry for the data source originating the upstream packet, select the upstream packet and add the entry for the data source to the register, and based on the register including an entry for the data source originating the upstream packet, select the local packet and clear the register.

3. The circuit of claim 1, wherein each of the plurality of data arbiters further includes a first in, first out (FIFO) buffer for storing at least one of the upstream data packet and the local data packet.

4. The circuit of claim 1, wherein the controller is further configured to cause the register to store the indication of data packets passed by the multiplexer based on a respective tag associated with each of the data packets, the respective tag indicating the respective data source originating the data packet.

5. The circuit of claim 1, further comprising an upstream data arbiter configured to merge data from at least two of the multiple data sources at a point upstream of the pipeline, the data arbiter including a register configured to store an indication of data packets passed by the data arbiter based on the respective data source originating the data packet.

6. The circuit of claim 5, wherein the upstream data arbiter is a first upstream data arbiter, and further comprising a second upstream data arbiter configured to merge data from the first upstream data arbiter and at least one of the multiple data sources at a further point upstream of the pipeline.

7. The circuit of claim 1, wherein the data pipeline includes at least two parallel segments, and further comprising a further data arbiter configured to merge data from at least two parallel segments to a unified segment of the data pipeline.

8. The circuit of claim 1, wherein the data packet includes at least one of 1) a request to read or write data at a device at a terminal point of the data pipeline, 2) data to be stored at a device at a terminal point of the data pipeline, and 3) a request to access a resource at a terminal point of the data pipeline.

9. The circuit of claim 1, wherein the register maintains a count of data packets passed by the multiplexer based on the respective data source originating the data packet, and wherein the controller is further configured to:
based on a count for the data source originating the upstream packet being below a threshold, select the upstream packet and increment the count for the data source at the register, and
based on the count exceeding the threshold, select the local packet and clear the register.

10. The circuit of claim 1, wherein the controller is further configured to control the multiplexer to select the upstream data packet based on a flag indicating a requirement to forward a sequence of multiple data packets without interruption.

11. A method of arbitrating data traffic, comprising:
at each of a plurality of distinct points in a data pipeline connecting multiple data sources to a data receiver:
selectively passing, to the data pipeline, an upstream data packet or a local data packet from a respective data source;
storing an indication of data packets passed based on the respective data source originating the data packet; and
selecting the upstream data packet or the local data packet based on the indication of data packets passed by the multiplexer.

12. The method of claim 11, further comprising:
based on the absence of an entry for the data source originating the upstream packet, selecting the upstream packet and adding the entry for the data source to a register, and
based on detecting an entry for the data source originating the upstream packet, selecting the local packet and clearing the register.

13. The method of claim 11, further comprising storing at least one of the upstream data packet and the local data packet to a first in, first out (FIFO) buffer.

14. The method of claim 11, further comprising storing the indication of data packets passed based on a respective tag associated with each of the data packets, the respective tag indicating the respective data source originating the data packet.

15. The method of claim 11, further comprising:
merging data from at least two of the multiple data sources at a point upstream of the pipeline; and
storing an indication of data packets passed based on the respective data source originating the data packet.

16. The method of claim 15, further comprising merging data from the point upstream of the pipeline and at least one of the multiple data sources at a further point upstream of the pipeline.

17. The method of claim 11, wherein the data pipeline includes at least two parallel segments, and further comprising merging data from at least two parallel segments to a unified segment of the data pipeline.

18. The method of claim 11, wherein the data packet includes at least one of 1) a request to read or write data at a device at a terminal point of the data pipeline, 2) data to be stored at a device at a terminal point of the data pipeline, and 3) a request to access a resource at a terminal point of the data pipeline.

19. The method of claim 11, further comprising:
maintaining a count of data packets passed by the multiplexer based on the respective data source originating the data packet;
based on a count for the data source originating the upstream packet being below a threshold, selecting the upstream packet and increment the count for the data source at the register; and
based on the count exceeding the threshold, selecting the local packet and clear the register.

20. The method of claim 11, further comprising controlling the multiplexer to select the upstream data packet based on a flag indicating a requirement to forward a sequence of multiple data packets without interruption.

21. A circuit, comprising:
at each of a plurality of distinct points in a data pipeline connecting multiple data sources to a data receiver:
means for selectively passing, to the data pipeline, an upstream data packet or a local data packet from a respective data source;
means for storing an indication of data packets passed based on the respective data source originating the data packet; and
means for selecting the upstream data packet or the local data packet based on the indication of data packets passed by the multiplexer.

* * * * *